United States Patent [19]

Yehezkeli

[11] Patent Number: 5,301,986
[45] Date of Patent: Apr. 12, 1994

[54] CLAMP

[75] Inventor: Oded Yehezkeli, Kiryat Hai, Israel

[73] Assignee: State of Israel-Ministry of Defense, Armament Development Authority, Raphael, Haifa, Israel

[21] Appl. No.: 959,319

[22] Filed: Oct. 9, 1992

[30] Foreign Application Priority Data

Oct. 9, 1991 [IL] Israel .................................. 99695

[51] Int. Cl.[5] .................................. F16L 23/036
[52] U.S. Cl. .................................. 285/367; 285/407; 285/411; 24/279
[58] Field of Search ............... 285/407, 408, 409, 410, 285/411, 365, 366, 367; 24/279, 282

[56] References Cited

U.S. PATENT DOCUMENTS

| | | | |
|---|---|---|---|
| 2,341,828 | 2/1944 | Tetzlaff | 24/279 |
| 2,841,420 | 7/1958 | Woolsey et al. | 285/367 X |
| 2,842,385 | 7/1958 | Webster et al. | 285/411 X |
| 2,937,037 | 5/1960 | Woolsey | 285/367 X |
| 3,019,036 | 1/1962 | Stranger | 285/411 X |
| 3,235,293 | 2/1966 | Condon | 285/367 X |
| 3,458,217 | 7/1969 | Pride, Jr. et al. | 24/279 X |
| 3,861,723 | 1/1975 | Kunz . | |
| 4,128,921 | 12/1978 | Heinze et al. | 285/408 X |
| 4,185,858 | 1/1980 | Peash | 285/307 |

FOREIGN PATENT DOCUMENTS

| | | | |
|---|---|---|---|
| 0626052 | 8/1961 | Canada | 24/279 |
| 1191181 | 4/1965 | Fed. Rep. of Germany | 24/279 |
| 0860626 | 2/1961 | United Kingdom | 285/367 |
| 1308043 | 2/1973 | United Kingdom | 24/279 |

Primary Examiner—Randolph A. Reese
Assistant Examiner—Heather Chun
Attorney, Agent, or Firm—Helfgott & Karas

[57] ABSTRACT

A clamp for joining a pair of elements having generally circular flanges, the clamp including an inner flange engaging portion arranged to provide generally axially extending forces to said flanges for retaining them against one another when substantially radial forces are applied to the inner flange, an outer circumferential strap element and at least one bolt. The clamp also includes a coupler engaging the strap element adapted to provide substantially circumferential tension thereto, whereby substantially radial forces are applied to the inner flange without urging non-circumferential bending of the strap element.

4 Claims, 3 Drawing Sheets

5,301,986

CLAMP

FIELD OF THE INVENTION

The present invention relates generally to clamps and more particularly to clamps for joining a pair of members having generally circular flanges.

BACKGROUND OF THE INVENTION

Various types of clamps are known. There are known, particularly in the missile art, V-clamp joints which exhibit relatively high strength and stiffness. One such clamp is described in U.S. Pat. No. 3,861,723. This clamp comprises a pair of flexible straps which are stretched by a pair of corresponding belts and push radially V-shaped retainer elements which press together the flanges of the connected elements. The bolts and the straps are connected by trunnion-like elements and cooperating loops formed by bending the ends of the straps.

This known prior art structure results in high stresses being applied to the straps, bolts and fasteners or weldings of the loops.

SUMMARY OF THE INVENTION

The present invention seeks to provide an improved clamp which is suitable, inter alia, for missile applications.

There is thus provided in accordance with a preferred embodiment of the present invention a clamp for joining a pair of elements having generally circular flanges comprising:

an inner flange engaging portion arranged to provide generally axially extending forces to said flanges for retaining them against one another when substantially radial forces are applied to the inner flange;

an outer circumferential strap element;

at least one bolt;

a coupler engaging the strap element and adapted provide substantially circumferential tension thereto, whereby substantially radial forces are applied to the inner flange without urging non-circumferential bending of the strap element.

There is further provided in accordance with a preferred embodiment of the invention a clamp for joining a pair of elements having generally circular flanges, the clamp comprising:

an inner flange engaging portion arranged to provide generally axially extending forces to said flanges for retaining them against one another;

an outer strap element;

apparatus for tensioning the strap element, thereby to exert radially extending forces on said inner flange engaging portion, the apparatus for tensioning including bolt apparatus and engaging apparatus coupling the bolt apparatus to the strap element for applying a tension force thereto, the entirety of the outer strap element being arranged substantially circumferentially, such that the tension force applied thereto by the bolt apparatus does not urge non-circumferential bending of the strap element.

In accordance with a preferred embodiment of the present invention, the strap element is formed with apertures adjacent free ends thereof and the engaging apparatus extends through the apertures and apply tension force to the strap element along edge surfaces of the apertures.

Preferably the bolt apparatus is arranged with respect to the engaging apparatus and the strap apparatus such that substantially all forces applied across the bolt apparatus extend axially therealong.

Additionally in accordance with a preferred embodiment of the present invention there is also provided a nut apparatus defining a spherical surface engaging the engaging apparatus.

Further in accordance with a preferred embodiment of the present invention there is provided a clamp for joining a pair of elements having generally circular flanges comprising:

an inner flange engaging portion arranged to provide generally axially extending forces to said flanges for retaining them against one another;

an outer strap element mounted in slidable relationship with respect to the inner flange engaging portion; and apparatus for tensioning the strap element, thereby to exert radially extending forces on the inner flange engaging portion.

In accordance with a preferred embodiment of the invention, the ends of the outer strap element are broadened for greater strength.

In accordance with a preferred embodiment of the invention, bending of the outer strap element and riveting thereof are obviated.

BRIEF DESCRIPTION OF THE DRAWINGS

The present invention will be understood and appreciated more fully from the following detailed description, taken in conjunction with the drawing in which.

DETAILED DESCRIPTION OF A PREFERRED EMBODIMENT

Reference is now made to FIGS. 1A-4, which illustrate a clamp, constructed and operative in accordance with a preferred embodiment of the present invention, for securely joining two elements having generally circular flanges.

Figure 1A:
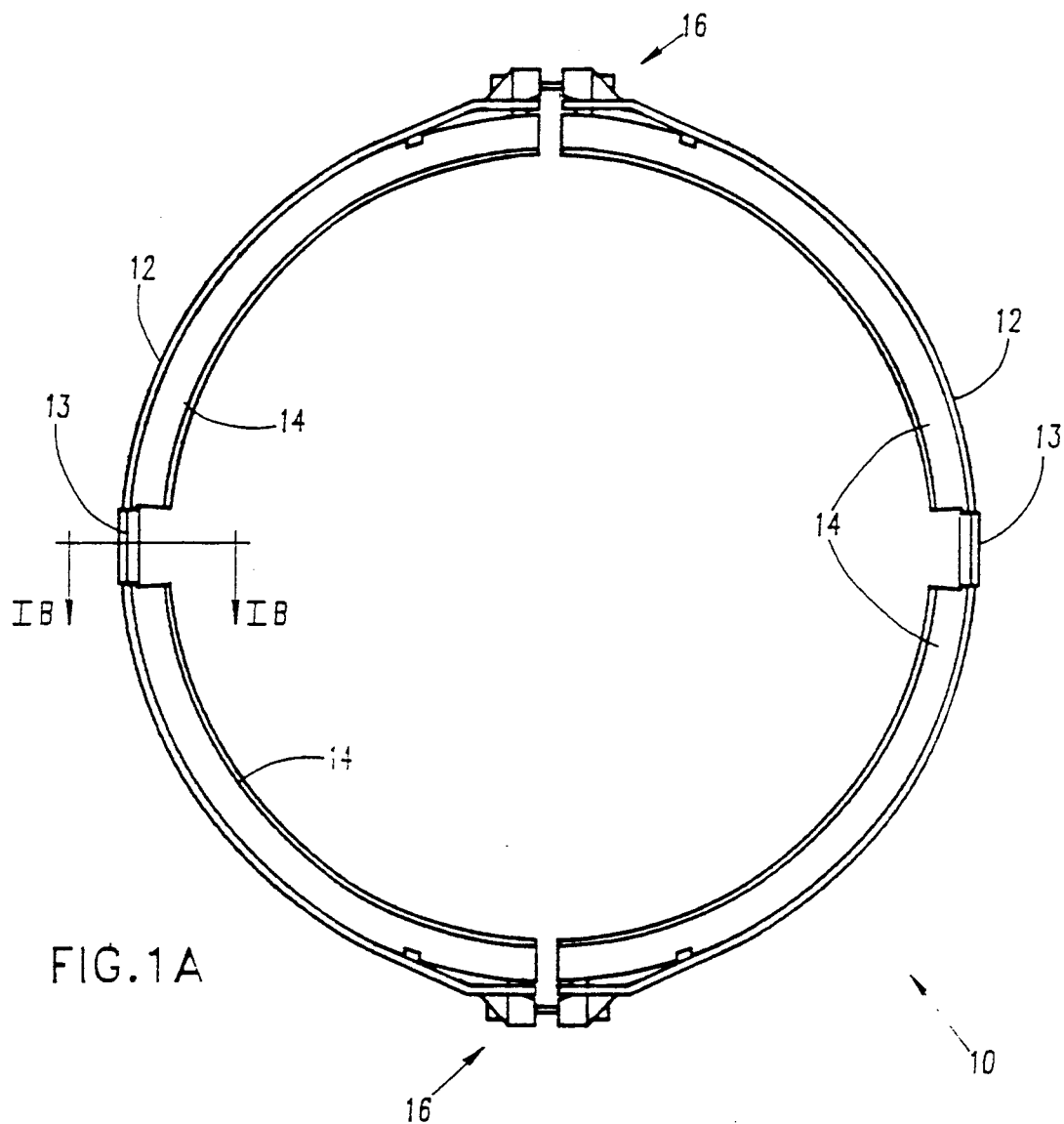
FIG. 1A is a generalized side view illustration of a clamp constructed and operative in accordance with a preferred embodiment of the present invention.

The clamp, indicated generally by reference numeral 10, preferably comprises a pair of outer strap elements 12 which are arranged in generally circumferentially surrounding relationship with an inner, generally V-shaped, flange engaging assembly, typically comprising two spaced curved flange clamp elements 14, which are arranged in a generally circular configuration as shown in FIG. 1A.

Figure 1B:
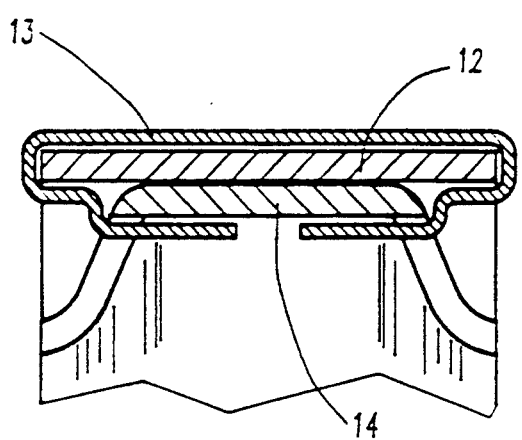
FIG. 1B is a sectional illustration of part of the apparatus of FIG. 1A, taken along lines IB—IB.

As seen in FIG. 1B, each of the flange clamp elements 14 is notched at a location intermediate along its length and an alignment clamp 13 is provided thereat to maintain alignment between elements 12 and 14. It is appreciated that elements 12 and 14 are not fixedly joined to each other as in the prior art, but are relatively loosely held by alignment clamp 13 so that they can slide azimuthally relative to each other.

In accordance with a preferred embodiment of the invention there are provided a pair of strap tensioning assemblies 16, which are operative for tensioning the strap elements 12, thereby to exert radially extending forces on the inner flange engaging assembly.

In accordance with a preferred embodiment of the invention, each of the strap tensioning assemblies 16 includes a bolt 18 and an engaging apparatus 20 coupling the bolt to ends of the strap elements for applying a tension force thereto in a way such that substantially the entirety of the outer strap element is arranged substantially circumferentially, such that the tension force applied thereto by the bolt 18 does not urge non-circumferential bending of the strap element.

In accordance with a preferred embodiment of the present invention, the strap element is formed with apertures 22 adjacent free ends 24 thereof and the engaging apparatus 20 extends through the apertures 22 and applies a tension force to the strap element 12 along engaged edge surfaces of the apertures 22.

Preferably the bolt 18 is arranged with respect to the engaging apparatus 20 and the straps 12 such that substantially all forces applied across the bolt 18 extend axially therealong.

Preferably the engaging apparatus 20 comprises a cast steel element which includes a tapered portion 21 which extends underneath part of free end 24 and may be aligned with the clamp elements 14 by means of a pin 26. The engaging apparatus 20 also includes a portion 27 which extends through apertures 22 and defines a bore 28 through which bolt 18 extends and against a suitably curved surface of which a nut and washer assembly 30, preferably having a rounded face, is tensioned by suitable threaded engagement with bolt 18. The provision of curved engagement surfaces of assembly 30 and bore 28 assists in preventing bending of bolt 18.

Figure 2:
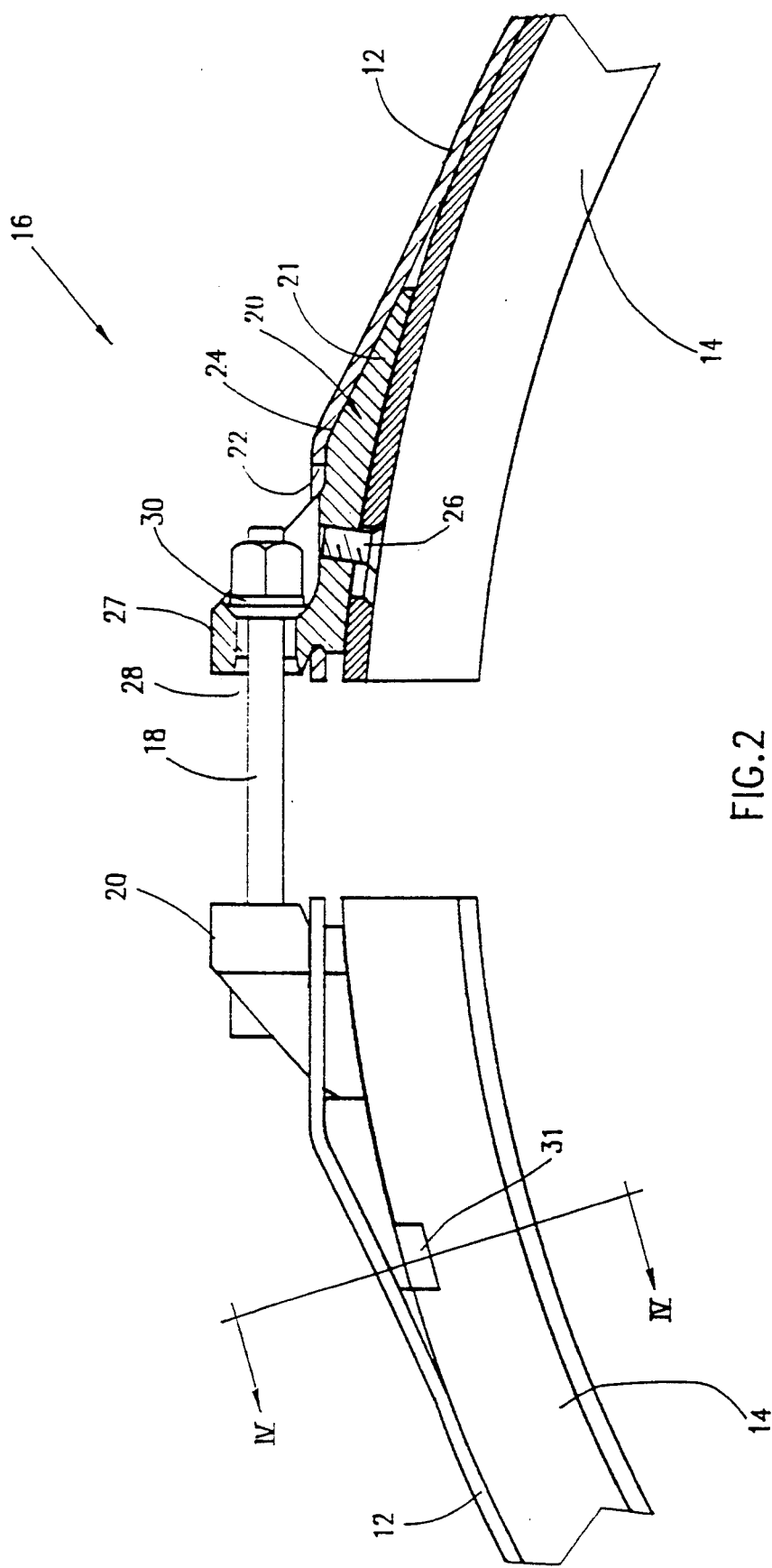
FIG. 2 is a detailed side view illustration of part of the clamp shown in FIG. 1.
Figure 4:
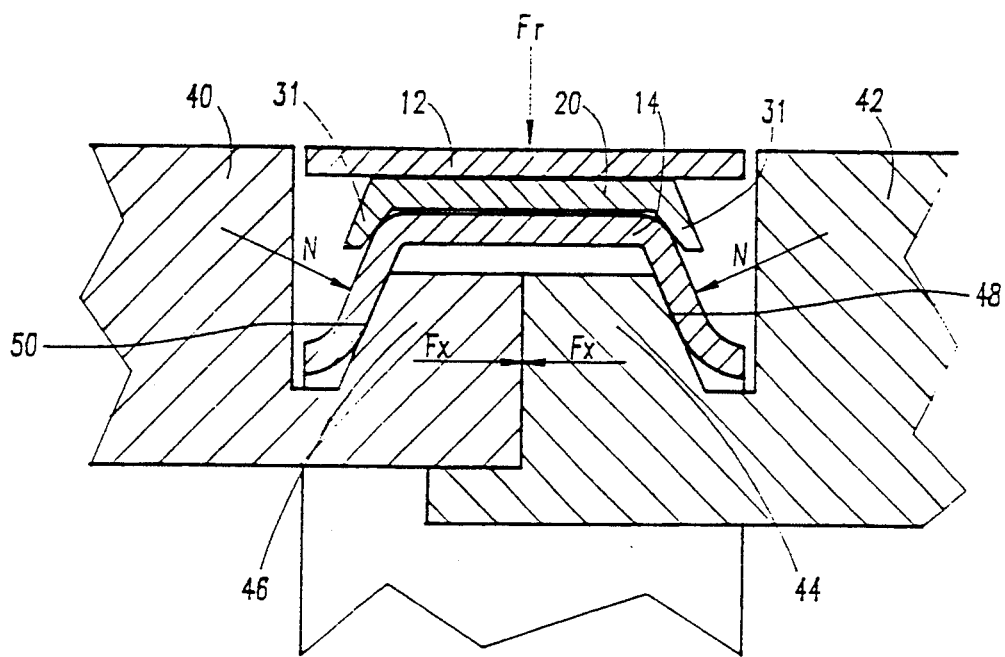
FIG. 4 is a sectional illustration of the clamp of FIGS. 1-3 in operative association with a pair of flanged elements to be joined, the illustration being taken at a location on the clamp indicated along lines IV—IV in FIG. 2.
Figure 3:
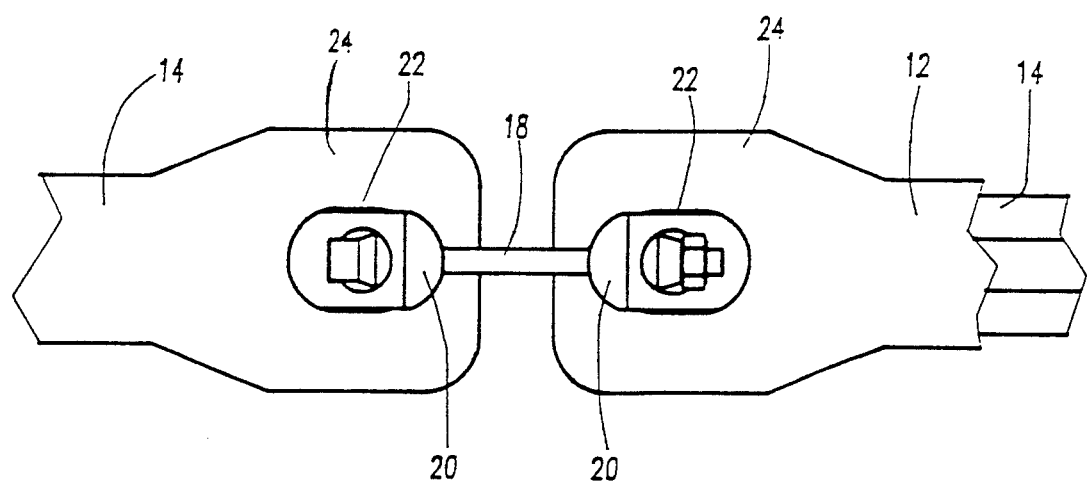
FIG. 3 is a pictorial view of part of the clamp shown in FIG. 2.

It can be seen from a consideration of FIGS. 2 and 4 that engaging apparatus 20 preferably includes side portions 31 which extend on both sides of clamp elements 14 for the purpose of maintaining mutual alignment.

FIG. 4 illustrates the engagement of two flanged elements 40 and 42 having respective recessed flanges 44 and 46 employing the clamp apparatus of the present invention. It is seen that due to the configuration of element 14, the radial inward force $F_r$ exerted by straps 12 produces normal forces N directed as illustrated against the inclined flange surfaces 48 and 50 respectively. These forces produce oppositely directed axial forces $F_x$ on the flanges as shown.

It will be appreciated by persons skilled in the art that the present invention is not limited by what has been particularly shown and described hereinabove. Rather the scope of the present invention is defined only by the claims which follow.

I claim:

1. A clamp for joining a pair of elements having generally circular flanges comprising:
   an inner flange engaging portion arranged to provide generally axially extending forces to said flanges for retaining them against one another when substantially radial forces are applied to the inner flange engaging portion;
   an outer circumferential strap element for applying said substantially radial forces to said inner flange engaging portion;
   at least one bolt;
   a coupler engaging the strap element, and
   wherein said strap element is formed with apertures adjacent free ends thereof defining internal edge surfaces abutting radially extending portions of said coupler, said apertures lying perpendicular to said radial forces, said portions of said coupler extending through said apertures, wherein said portions and said bolt apply a tension force to the strap element along said internal edge surfaces of said apertures.

2. A clamp according to claim 1 wherein the coupler comprises a bolt and pair of coupler elements engaging respective free end portions of the strap, said coupler elements being adapted to receive the bolt and to apply said circumferential tension to the strap when the bolt is tightened.

3. Apparatus according to claim 2 and wherein the respective coupler elements include side portions which extend on both sides of said inner flange engaging portion for maintaining mutual alignment therebetween.

4. Apparatus according to claim 1 and wherein the coupler includes side portions which extend on both sides of said inner flange engaging portion for maintaining mutual alignment therebetween.

* * * * *